United States Patent
Paya

[19]

[11] Patent Number: 5,660,507
[45] Date of Patent: Aug. 26, 1997

[54] CUTTING INSERT WITH NARROW FACE SEGMENT BETWEEN DEPRESSION AND EDGE

[75] Inventor: José Agustin Paya, Mühlheim, Germany

[73] Assignee: Widia GmbH, Essen, Germany

[21] Appl. No.: 553,612

[22] PCT Filed: May 10, 1994

[86] PCT No.: PCT/DE94/00560

§ 371 Date: Nov. 16, 1995

§ 102(e) Date: Nov. 16, 1995

[87] PCT Pub. No.: WO95/00271

PCT Pub. Date: Jan. 5, 1995

[30] Foreign Application Priority Data

Jun. 28, 1993 [DE] Germany ............... 43 21 426.6

[51] Int. Cl.⁶ .................... B23B 27/04; B23B 27/16
[52] U.S. Cl. ........................... 407/114; 407/117
[58] Field of Search ...................... 407/114, 116, 407/117

[56] References Cited

U.S. PATENT DOCUMENTS 4,159,884  7/1979  Schott ..................... 407/113
5,137,396  8/1992  Durschinger ............. 407/117
5,180,258  1/1993  Bernadic .................. 407/114

FOREIGN PATENT DOCUMENTS

| 0 208 668 A1 | 1/1987 | European Pat. Off. . |
| 0 307 563 A1 | 3/1989 | European Pat. Off. . |
| 0 310 239 A1 | 4/1989 | European Pat. Off. . |
| 0 312 223 A1 | 4/1989 | European Pat. Off. . |
| 0 360 774 A2 | 3/1990 | European Pat. Off. . |
| 0 414 241 A2 | 2/1991 | European Pat. Off. . |
| 28 40 610 C2 | 3/1979 | Germany . |
| 41 41 368 A1 | 6/1993 | Germany . |
| WO 93/11898 | 6/1993 | WIPO . |

*Primary Examiner*—Daniel W. Howell
*Assistant Examiner*—Kenneth J. Hansen
*Attorney, Agent, or Firm*—Hubert Dubno

[57] ABSTRACT

The invention relates to a cutting insert (10) for material-removing machining, especially for milling, turning or punching, with at least one cutting edge (12) and at least one chamfer (15) into which project depressions, or recesses (17) adjacent at a distance from the cutting edge and narrow them locally. To permit a very soft cut, stabilise the cutting edge (12) and attain high feeds, them are additional depressions (13) or recesses parallel to the depressions extending to the cutting edge and/or interrupting it for further narrowing the chamfer sections.

15 Claims, 4 Drawing Sheets

CUTTING INSERT WITH NARROW FACE SEGMENT BETWEEN DEPRESSION AND EDGE

CROSS REFERENCE TO RELATED APPLICATIONS

This is a national phase of PCT/DE94/00560 filed on 10 May 1994 and based, in turn, on German application P4321426.6 filed 28 Jun. 1993 under the International Convention.

FIELD OF THE INVENTION

The invention relates to a cutting insert for chip-removal machining, particularly for milling, turning or punching, with at least one cutting edge and at least one adjacent chamfer, into which project adjacent depressions or recesses at a distance from the cutting edge, defining narrowed segments.

Such cutting inserts are known for instance from EP 0 208 668 B1, whereby a chamfer is adjacent to the cutting edge under a 0 degree chamfer angle or a negative chamfer angle, into which project a number of depressions or recesses, which are arranged along the cutting edge separated from each other and at a distance from the cutting edge. Moreover the depressions and recesses project into the curved face continuing the chamfer towards the cutting insert middle.

Patent corresponding cutting insert is also shown by U.S. Pat. No. 5,180,258, wherein a positive chamfer is continued with a downward sloping flank towards the middle of the face of the cutting insert. This flank has indentations with a trapezoidal cross section which reach down to the depressed middle of the face bottom.

From EP 0 360 774 A2 a polygonal cutting insert is known which is supposed to have on its face a multitude of ribs, the distance between them decreasing in the direction of the cutting insert center. Between the ribs there are synclinal depressions, whose deepest point is supposed to lie below the cutting edge plane. These depressions extend in a partial area in a negative chamfer continuing the cutting edge. This tool is supposed to insure that the chip is deflected from the tool during machining.

The DE 28 40 610 A1 describes a cutting insert for improving chip breaking and chip removal, even under strongly variable cutting conditions. The cutting insert has indentations along the cutting edge or cutting edges in an uninterrupted succession, which are shaped so that their width or biggest extent parallel to the cutting edge is greater than the distance between two neighboring or successive indentations. These indentations interrupt the cutting edge and towards the rear end are shaped with a very sharp edge towards the face. The face can be additionally provided with a chamfer running along the cutting edge, whose width decreases from the cutting edge corner towards the cutting edge middle.

The cutting insert according to EP 0 414 241 A2 has notches on the relief flank as well as on the face, which in the area of the cutting edge run into each other, whereby the cutting edges recede in the notched areas with respect to the remaining cutting edge areas. The respective trapezoidal shape has sharp edges and because of that a targeted long tool life can not be achieved, except under certain conditions. Besides the friction created on the face during chip flow removal is very high. This cutting insert can only be used for a specific finishing operation.

In the WO 93/11898 a cutting insert for rough machining of metallic workpieces at high advancement rates is described, wherein for improving the chip removal flow during cutting indentations lying along the cutting edge form a trapezoidal shape in a cross section lying parallel to the cutting edge and perpendicularly to the face, whose trapezoidal flanks are opened towards the face, whereby the face bottom tapers off towards the cutting edge at a negative angle or a cutting angle of 0° and the face has a positive cutting angle in the area between indentations and the cutting edge.

OBJECT OF THE INVENTION

It is the object of the present invention to provide a cutting insert which makes possible a very soft and friction-poor cutting, with a stabilized cutting edge and by means of which high advance rates are possible.

SUMMARY OF THE INVENTION

This object is achieved due to the cutting insert according to claim 1, which is characterized in that depressions or recesses reaching up to the cutting edge and/or interrupting the same are provided for a further narrowing of the chamfer segments. It has be found that the chip formation and the chip removal can be influenced in an optimal and controlled manner only when the chip is influenced directly at the cutting edge or very close to it. The solution offered by the invention is particularly suitable in the case of high advance rates. Thereby an effect results which is bigger than the sum of effects resulting in cases of unilateral narrowing of the chamfer through respective depressions or recesses, particularly when the protection of the cutting edge is taking into account. Therefore an essential feature consists in that, seen from the cutting edge as well as from a distance to the cutting edge, corresponding oppositely located depressions or recesses have to be provided, which considerably narrow the chamfer in the respective areas.

Thus for instance the chamfer can be arranged at a positive, a negative or a 0° chamfer angle.

A further embodiment of the invention the additional indentations or recesses in perpendicular direction to the cutting edge or in the direction of the chip removal flow can be synclinally shaped with a concavely curved chip removal surface or with a linearly ascending chip removal surface. Preferably in the case of linearly ascending chip removal surfaces the additional indentations or recesses are laterally bordered by ascending flanks which can be concave or flat. In order to avoid strong wear in the transition areas towards the chamfer, the edges are rounded. The same applies to the corners between the ascending flanks and the bottom of the depressions or recesses.

According to a further embodiment of the invention the depressions or recesses increase their width towards the cutting edge or towards the relief flank, which preferably is conically shaped. This configuration of the flanks causes a curving of the chip, combined with a poorer friction of the chip flow along the face.

For further stabilization of the cutting edge, next to or between the additional depressions or recesses a narrower chamfer can be provided, having a smaller positive or a 0° angle or an absolutely larger negative angle, which lies in these areas at a distance from the (wider) chamfer which continues the cutting edge. This narrow chamfer can also be rounded.

In order to minimize chip friction the face adjacent to the chamfer or to the wider chamfer, a downwards sloping flank is provided in perpendicular direction to the cutting edge, the borderline of the flank towards the chamfer or the wider chamfer running so that the distance of the borderline to the cutting edge is minimal in the areas wherein the additional depressions or recesses are located, so that the downwards sloping flank plays a part in defining the extent of the narrowing. In other words, the downward sloping flank reaches closer to the cutting edge in the areas of the frontal depressions or recesses than in other areas. The projecting areas of the downwards sloping flank represent then the (rear) recesses. Alternately thereto the narrowing of the chamfer segments can also be achieved by synclinal depressions and/or recesses in the face, which are located oppositely to the additional depressions or recesses. These depressions or recesses can also be combined with a downwards sloping flank or with an essentially level chip removal surface.

According to a further embodiment of the invention the width of the narrowed chamfer segments over a span parallel to the cutting edge is constant. This width of the narrowed chamfer segments measured parallelly with the cutting edge should preferably be bigger by 1.5 to 5 times than the distance between narrowed areas of chamfer.

The total width of the narrowed chamfer segments measured parallel to the cutting edge or the span of constant narrowing ranges between ¼ and ¾ of the total chamfer width, respectively cutting edge length. The width of the chamfer or of the wider chamfer measured perpendicularly to the cutting edge in the narrowed areas ranges preferably between ¼ to ¾ of the area without narrowing which ranges between 0.3 and 2 mm.

According to the invention the cutting edge shape, the face and preferably also the chamfer, can be provided with recessed and/or raised chip forming elements and/or can run parallelly to the cutting edge nonlinearly, preferably concavely or convexly curved or wave-shaped. The depth of the recesses or the indentations compared to the surrounding face areas should as a rule lie below 1.5 mm.

For the configuration of the cutting edge shapes, synclinal or raised chip forming elements, reference can be made to the embodiments known to the state of art, particularly to the chip forming elements, as well as the ribbed chip forming elements with or without notches, mentioned in DE 41 18 065 A1, Columns 1 and 2.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
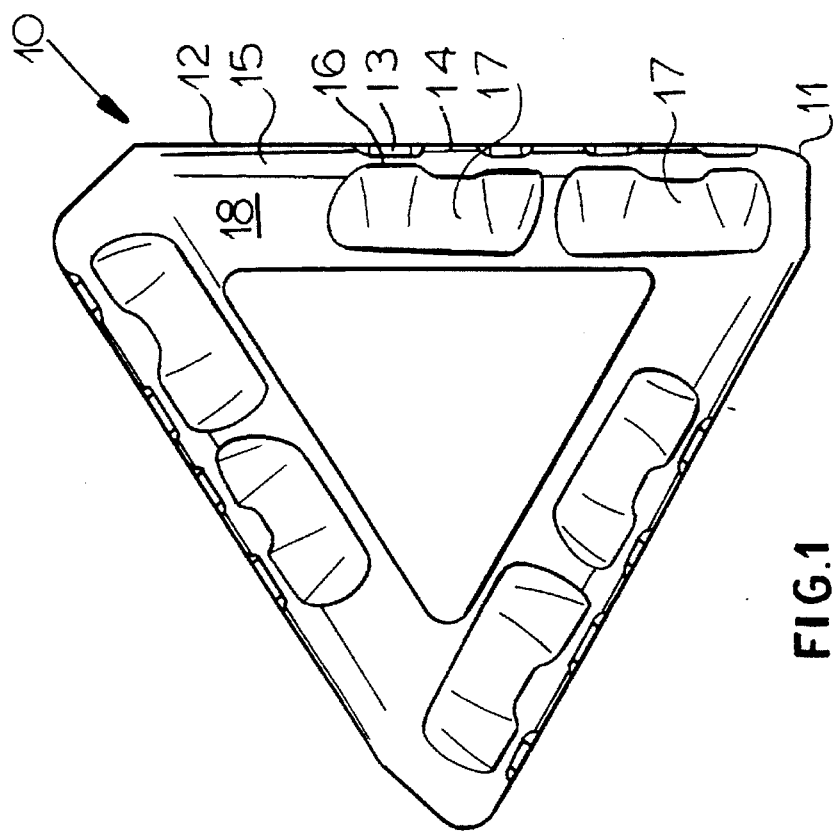
FIG. 1 is a top view of one of the embodiments of cutting inserts according to the invention.

The substantially triangular cutting insert 10 represented in FIG. 1 has three cutting corners 11 each with an adjacent (effective) cutting edge 12 as a borderline between the face and the relief flank. Recesses 13 which widen towards their frontal end are provided on the face and on the cutting edge 12 interrupting them in segments. These recesses 13 break through a narrower frontal first chamfer 14 and are deeper in perpendicular direction with respect to the cutting edge 12 than the respective width of chamfer 14. Adjacent thereto is a chamfer 15, which is reduced in segments to narrow areas 16, since in these areas recesses 13, as well as further recesses 17 are arranged opposite to each other, whereby in the present case the respective recesses 17 are arranged in a downwards sloping flank 18. The recesses 17 are synclinal and can have any desired shape, such as circle, oval, rectangle, or trapezoidal, such as is the case in the embodiment of FIG. 1. It is essential that these recesses 17 reach into the area of chamfer 15 and together with the frontal recesses 13 form a narrowing of the chamfer 15. The recesses can be evenly spaced from each other or executed only towards one cutting corner 11 approximately towards the middle of the cutting edge or over ⅔ of cutting edge length.

Figure 2:
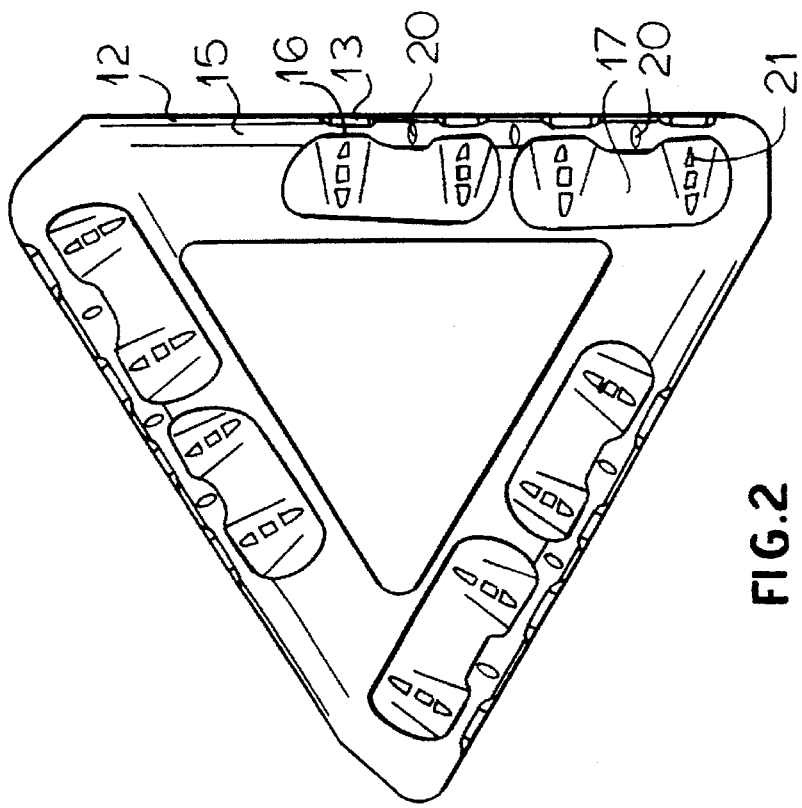
FIG. 2 is a top view of another embodiment according to the invention.

The embodiment according to FIG. 2 differs from the previously described embodiment only in that additional chip forming elements 20 and 21 are provided, which are arranged as raised chip forming elements 20 on chamfer 15, preferably in areas in which the chamfer 15 is not narrowed, i.e. outside the areas 16. Further chip forming elements 21 can also by provided in the synclines 17, somewhat in an arrangement such as described for instance in DE 41 18 065 A1. Here too the wedge-shaped chip forming elements are oriented perpendicularly to the cutting edge 12, especially pointing in the direction of the narrowed areas 16.

Instead of the illustrated triangular cutting insert other geometrical shapes can also be used, such as quadrangular, particularly square, diamond-shaped, nonagonal or also round cutting inserts, respectively cutting inserts which in a top view have at least a partially rounded cutting edge, which also seen in a top view on the relief flank, can have a rectilinear, convexly or concavely curved or wave-like shape.

FIGS. 3 to 5 and 6a, 6b and 6c shows how the invention applies to a punching insert with a cutting edge 12, a narrow chamfer 14 as well as two recesses 13 which widen towards the front and have lateral ascending flanks 19. In a corresponding manner to the descriptions of FIGS. 1 and 2, the chamfer 15 has narrowing areas 16, which are formed by the spaces between the recesses 13 and the recesses 22, which are developed as extension towards the cutting edge of a downwards sloping wall segment 18.

Advantageously the width of the broad segment of chamfer 15 measured perpendicularly to the cutting edge 12 is selected with a=0.3 to 2 mm, while the width b of the narrowed chamfer segment 16 ranges between ¼ to ¾ of the width a. The length I of the recess 13, which corresponds to the span of the narrowed segment plus the two widening areas of the chamfer, is 1.5 to 5 times bigger than the area between two depressions, that is the area of maximum chamfer width. Altogether the total width of all narrowed chamfer areas in relation to the total width of the chamfer, respectively cutting edge length should equal approximately ¼ to ¾ of just this length. The width c of the narrow chamfer equals ⅓ to ½ of the size of the total width a+c.

Figure 4:
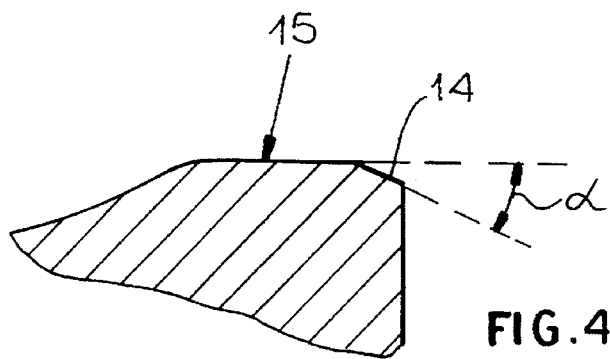
FIG. 4 is a sectional view along line IV—IV according to FIG. 3.
Figure 5:
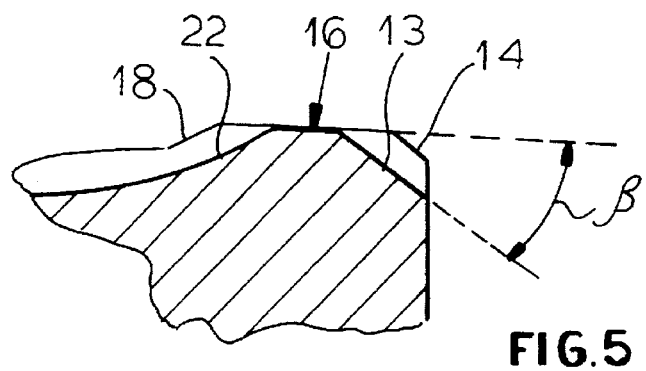
FIG. 5 is a sectional view along line V—V according to FIG. 3.

As can be seen from FIG. 4, in the present case the chamfer 15 is arranged at a chamfer angle of 0°, whereby this chamfer angle ranges preferably between −10° and +10°, while the narrower chamfer 14 has a negative chamfer angle α of −20° to −5°. However the chamfer 15 can also be executed at a positive or negative angle, whereby the chamfer 15 can be provided also without the chamfer 14. The narrower chamfer 14 forms always an obtuse angle under 180° with the chamfer 15. From the section according to FIG. 5 it can be seen how the narrowing 15 is formed by the recess 22, respectively 13. The recess 13 lies under an angle β between −15° and +3°.

Figure 6A:
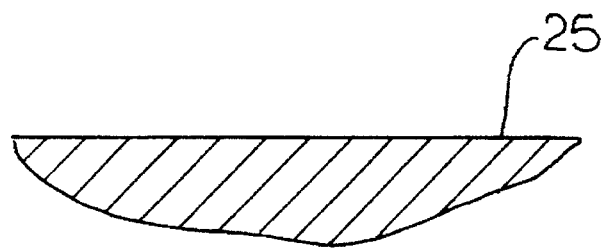
FIGS. 6a, 6b and 6c are sectional views along the line VI—VI seen in FIG. 3.
Figure 6B:
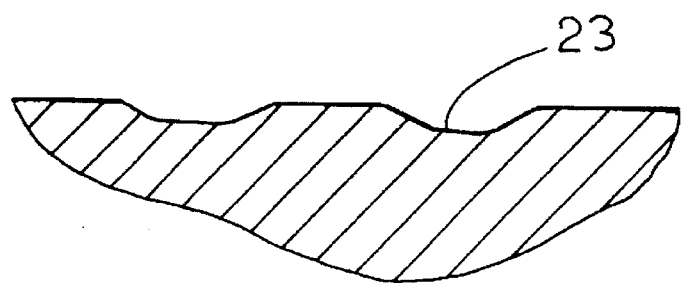
Figure 6C:
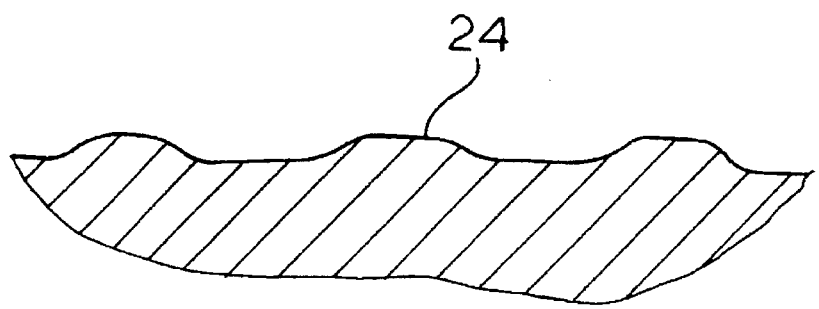

FIGS. 6a, 6b and 6c demonstrate that it is possible to provide depressions 23 or projections 24 on the chamfer 15 in the narrowed area 16, just as it is possible to have a level-surfaced, i.e. rectilinear chamfer 15 (compare reference numeral 25).

Figure 3:
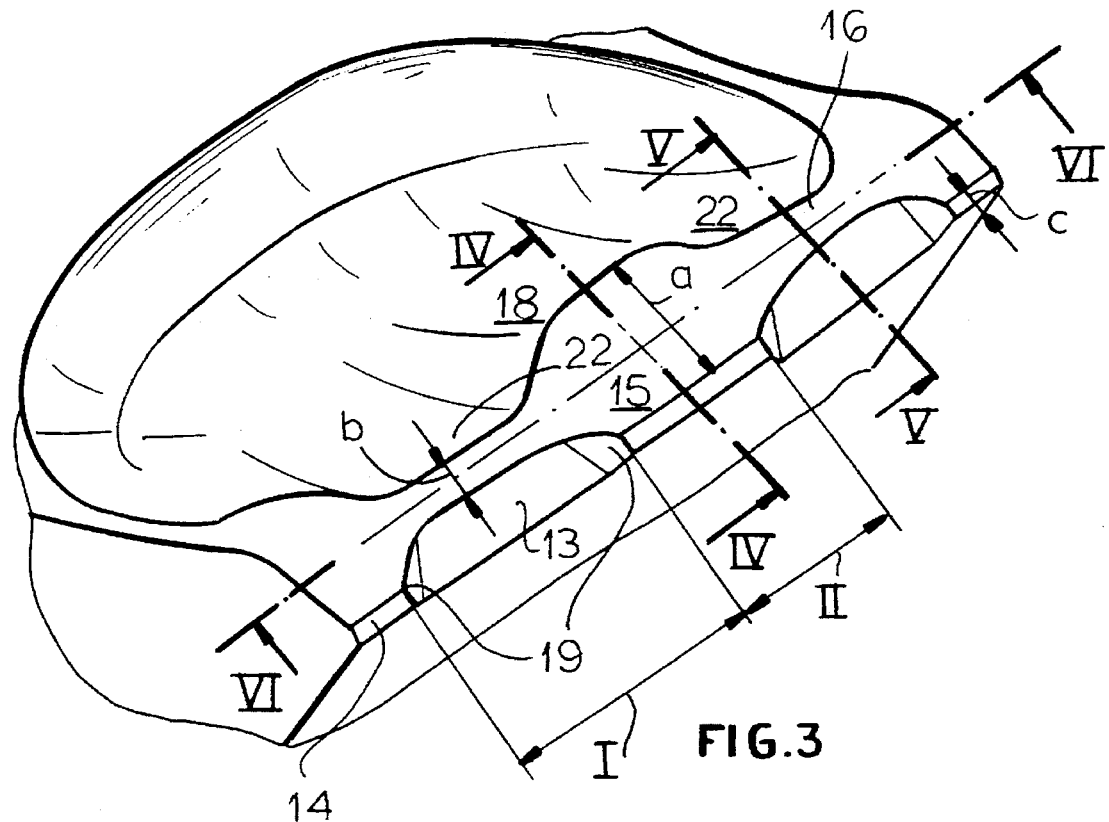
FIG. 3 is a partial perspective view of a punching insert.

However the present invention is not in any way limited to the represented embodiments, it is just as possible to have embodiments wherein partial elements of FIG. 1 and 2 are used in the punching tool of FIG. 3, and vice versa.

Figure 7:
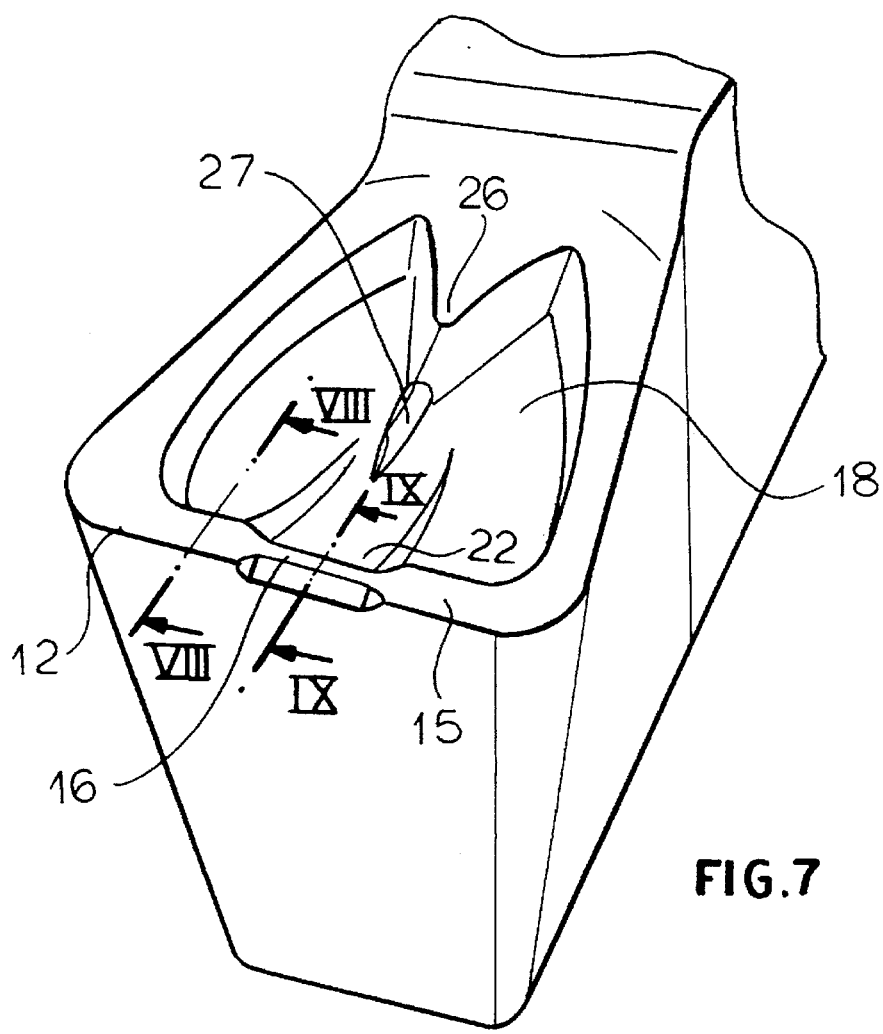
FIG. 7 is a partial perspective view of another embodiment of punching insert according to the invention.
Figure 8:
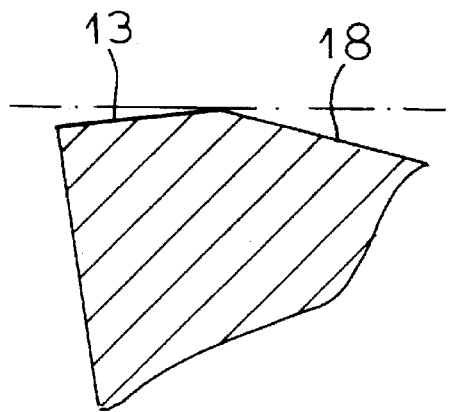
FIG. 8 is a sectional view along the line VIII—VIII shown in FIG. 7.
Figure 9:
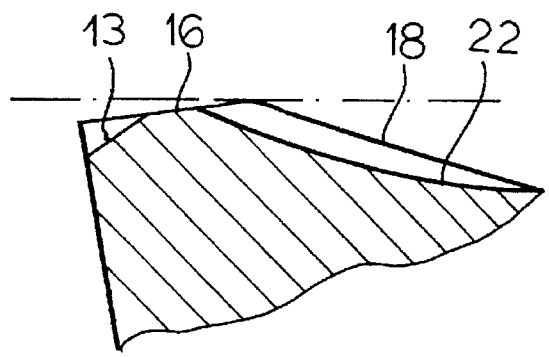
FIG. 9 is a sectional view along the line E—E.

The punching insert according to FIG. 7 to 9 has over its entire cutting edge 12 only a single recess 13, which is arranged in the middle of the cutting edge. Otherwise it corresponds to the description of FIG. 3, except for the fact that there is no chamfer 14, but only one chamfer 15 is provided. The face is synclinally shaped and has a chip forming element 26, which has a wedge perpendicularly oriented with respect to the cutting edge 12 in the shape of longitudinal ribs. The configuration of these wedges, respectively longitudinal ribs is the object of DE 41 36 417.1 A1 to whose disclosure reference is made.

What is claimed is:

1. A cutting insert for a chip-removal machining comprising:

an upper rake face lying in a first plane and defined by a side face lying in a respective plane extending transversely to the first plane, the rake and side faces forming at least one cutting edge therebetween;

at least one depression formed on the rake face and terminating at a distance from the cutting edge;

a chip breaking face defined between the cutting edge and the depression on the rake face, the depression being formed with at least one projection extending into the chip breaking face and toward the cutting edge but terminating at a distance therefrom, forming thereby a respective narrow segment of the chip breaking face; and a longitudinal recess formed on the narrow segment of the chip breaking face and extending along and intersecting the cutting edge.

2. The cutting insert defined in claim 1 wherein the cutting edge is beveled and extends at an obtuse angle with respect to the chip breaking face.

3. The cutting insert defined in claim 2 wherein said cutting edge is at an angle of −20° to −5° with respect to said chip breaking face, said chip breaking face having an angular orientation of −10° to +10°.

4. The cutting insert defined in claim 1 wherein the chip breaking face is formed with a wide segment adjacent the narrow segment and defined between said depression and said cutting edge, said wide segment having a width ranging between 0.3 to 2 mm and said narrow segment being from ¼ to ¾ of the width of said wide segment.

5. The cutting insert defined in claim 4 wherein the wide segment is provided with a chip forming element, said chip forming element being a cavity or a raised element and extending in a plane generally perpendicular to said cutting edge towards said depression.

6. The cutting insert defined in claim 5 wherein each of said rake face and side face is curved and terminates with a respective rounded edge bordering said chip breaking face.

7. The cutting insert defined in claim 5 wherein said rake face and side face diverge from one another downwardly from said chip breaking face.

8. The cutting insert defined in claim 1 wherein said recess is synclinal and formed with a chip flow surface, said flow surface being flat and being flanked by a pair of upwardly sloping flanks.

9. The cutting insert defined in claim 8 wherein said chip flow surface is curved concavely and terminates at said chip breaking face.

10. The cutting insert defined in claim 1 wherein said depression is formed with two projections spaced apart and two recesses, each of the recesses facing a respective depression and forming therewith a respective narrow segment of the chip breaking face.

11. The cutting insert defined in claim 10 wherein said recesses are spaced apart at a distance less than a length of each of said recesses.

12. The cutting insert defined in claim 1 wherein said narrow segment of said chip breaking face has a uniform width defined between said recess and said projection of said depression.

13. The cutting insert defined in claim 1 wherein a length of said recess ranges between ¼ and ¾ of a total length of said cutting edge.

14. The cutting insert defined in claim 1 wherein said cutting edge is rectilinear or wave-shaped or concave or convex.

15. The cutting edge defined in claim 1 wherein said recess is 1.5 mm depth at most.

* * * * *